United States Patent [19]

Gemperle

[11] 3,752,920

[45] Aug. 14, 1973

[54] APPARATUS FOR ENCIPHERING AND DECIPHERING MULTIDIGIT CODED SIGNALS

[75] Inventor: Bruno Gemperle, Steinhausen, Switzerland

[73] Assignee: Anstatt Europaische Handelsgesellschaft, Vaduz, Liechtenstein

[22] Filed: July 28, 1971

[21] Appl. No.: 166,810

[30] Foreign Application Priority Data

Aug. 20, 1970 Switzerland ........................ 12497/70

[52] U.S. Cl. ........................................ 178/22
[51] Int. Cl. ........................................ H04l 9/04
[58] Field of Search ........................................ 178/22

[56] References Cited

UNITED STATES PATENTS

| | | | |
|---|---|---|---|
| 3,522,374 | 7/1970 | Abrahamsen | 178/22 |
| 3,541,257 | 11/1970 | McCormick | 178/22 |
| 3,051,783 | 8/1962 | Hell et al. | 178/22 |
| 3,291,908 | 12/1966 | Ehrat | 178/22 |
| 3,267,213 | 8/1966 | Berger | 178/22 |

*Primary Examiner*—Benjamin A. Borchelt
*Assistant Examiner*—H. A. Birmiel
*Attorney*—David Toren et al.

[57] ABSTRACT

An apparatus for enciphering and deciphering multidigit coded signals, comprising a key generator and an input storage, both said key generator and input storage being connected with a mixing stage. The mixing stage serves to couple in character element fashion signals delivered from the input storage with signals delivered from the key generator. This input storage contains a first storage stage with a number of individual stores in which there can be stored in character element fashion a number of successive signals corresponding to the number of individual stores. A comparison detector responds to the majority of the similar type character elements of the same digit or place value recorded at the individual stores by producing a majority signal. This detector is connected with the second storage stage of the input storage and said second storage stage receives the majority signal produced by the individual stores of the first storage stage.

2 Claims, 3 Drawing Figures

INVENTOR.
BRUNO GEMPERLE
BY Toren and McGeady
Attorneys

Patented Aug. 14, 1973 3,752,920

2 Sheets-Sheet 2

INVENTOR.
BRUNO GEMPERLE
BY Toren and McGeady
Attorneys

APPARATUS FOR ENCIPHERING AND DECIPHERING MULTIDIGIT CODED SIGNALS

BACKGROUND OF THE INVENTION

The present invention relates to an improved apparatus for enciphering and deciphering multidigit coded signals.

The field of electronics has rendered possible the realization of ciphering devices which require only a small amount of thought processes on the part of the operator, thus considerably increasing transmission reliability.

The equipment which was heretofore conventionally employed required that the location receiving secret texts for deciphering must be aware of certain key elements in order to process the relevant message or text, that is to say, to perform the deciphering operation. On the basis of this information an internal key generator produces a so-called key chain, the length of which is accommodated to requirements.

Oftentimes the aforementioned key information is sub-divided into:

1. an internal or base key which need not be known to the operator, since it is fixed, or at least can remain constant for a longer time span and is generally programed into the equipment in such fashion that it cannot be externally recognized;

2. a message- or text key (also known as a code word) which can be changed for each communication. This code word naturally must be like-wise known at the receiver, since, together with the base key information already available at the equipment, collectively forms the entire key information necessary for the operation of the equipment.

The transmission of the code word in clear form by means of the communication channel which is available is not permissible as a general rule, since it would place into the hands of third parties a portion of the key information, and in this way, under certain circumstances, could considerably facilitate the unauthorized deciphering or decrypting of the message or communication which must be maintained secret.

SUMMARY OF THE INVENTION

Therefore, from what has been stated above, it will be recognized that a real need still exists in the art for providing apparatus for enciphering and deciphering multidigit coded signals which is not associated with the aforementioned drawbacks of the prior art constructions. Hence, a primary objective of this invention is to provide just such type apparatus which satisfactorily and reliably fulfills the existing need in the art and overcomes the aforementioned drawbacks associated with the previously discussed prior art equipment.

Another and more specific object of the present invention is directed towards the provision of a novel enciphering device wherein knowledge of the code word is not even absolutely required by the operator at the receiving location.

In fact, it is within the contemplation of this invention to transmit the code word in a camouflaged or veiled form as a text or message head together with the text and at the receiving, that is at the deciphering apparatus, to deliver such in an unveiled form to the key generator, whereafter then there is a switch-over from plain text operation to secret text operation. The expression "camouflaged" or "veiled" is intentionally used to denote the operation resulting in a special enciphering of the code word in contrast to enciphering of the actual text or message.

Hence, from what has been discussed above, it is to be appreciated that the concept of this development is directed towards the provision of a novel apparatus for enciphering and deciphering multidigit coded signals which is of the type incorporating a key generator and an input storage, both the key generator and the input storage being operatively connected with a mixing stage. At the mixing stage the signals delivered by the input storage are coupled in character element fashion (bitwise with the signals delivered by the key generator. According to important aspects of the invention, the input storage contains a first storage stage embodying a number of individual stores in which a number of successive signals corresponding to the aforementioned number of individual stores can be stored in character element fashion (bitwise). There is also provided a comparison detector which responds to the majority of the similar type character elements (bits) of the same place or digit value registered at the individual stores by producing a majority signal. This detector is coupled with a second storage stage of the input storage, and this second storage stage has delivered thereto the majority signal determined at the first individual stores.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

At this juncture it should be perhaps mentioned that with the nowadays utilized communication systems written texts or messages are generally transmitted by teleprinters. In the event that the message is to be ciphered, then devices are available which can be directly operatively coupled into the telecommunications or teleprinter network (on-line ciphering). On the other hand, there also are in existence purely locally functioning devices which produce the enciphered text in printed or other form, for instance perforated tapes or the like (off-line ciphering).

In the instant situation it is absolutely immaterial to the explanation of the functionality of the system whether the apparatus is coupled into the telegraph line as a so-called teleciphering unit or whether one is concerned with the latter mentioned type of device, in other words an office machine having a keyboard and a printing mechanism or a perforated tape scanner and puncher, by means of which the messages or texts are locally processed (off-line ciphering).

Figure 2:
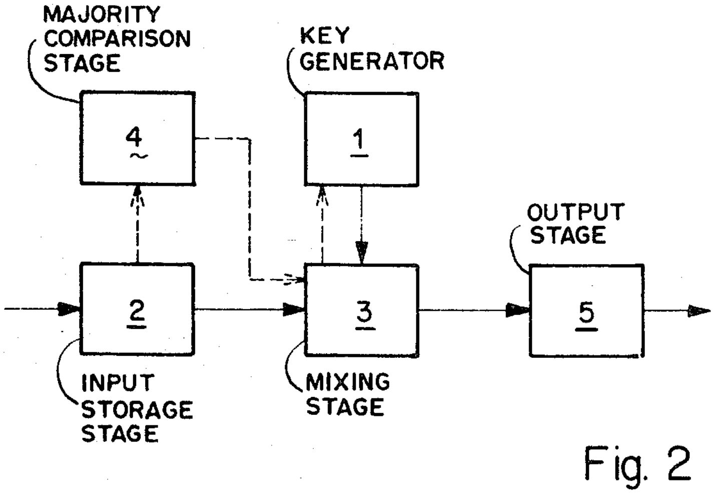
FIG. 2 is a block circuit diagram of the inventive arrangement.

It is also here mentioned that in accordance with the block diagram of FIG. 2 an embodiment of the inventive apparatus can generally be divided into the following functional groups:

a. an input storage stage 2 coupled with the majority comparison stage 4 as well as the mixing stage 3;

b. key generator 1 which acts upon the mixing stage 3, and the output stage 5 receiving information from the mixing stage 3.

For the purpose of fully explaining the concepts of this development, the description will proceed in two stages: Initially, on the basis of the detailed circuit diagram of FIG. 3 there will be considered a possible form of circuitry which can carry out the mentioned functions in a most simplified manner; theraeafter on the basis of the block diagram of FIG. 2 there will be more fully described a possible mode of operation for line-bound devices.

Now in the description of FIG. 3 which is to follow hereinafter the following prerequisites are applicable:

1. There is provided a three digit binary code (in teleprinting generally there is utilized a five digit, or more recently, an eight digit code).

2. There must be introduced a single character in a three-fold repetition, as the so-called text key, into the key generator 1 preprogramed with the base key. (The reference numerals or characters, appearing in parenthesis relate to the circuit groups of FIGS. 2 and 3.)

3. The input takes place by means of a keyboard KL, which has not been particularly shown as such and forms part of the input stage 2. It contains a number of different contacts which, in each instance, can be closed by actuation of the keys. What has been illustrated in FIGS. 3 are three double contacts (at the left bottom $kl_{11}$, at the right top $kl_{12}$, then $kl_{21}$ and $kl_{22}$ as well as $kl_{31}$ and $kl_{32}$). The first index designates a digit or place value of the binary information, the second index the contact numbers. By actuating a key, depending upon the arrangement of the three digit binary code one, two or all three pairs are closed.

Figure 3:
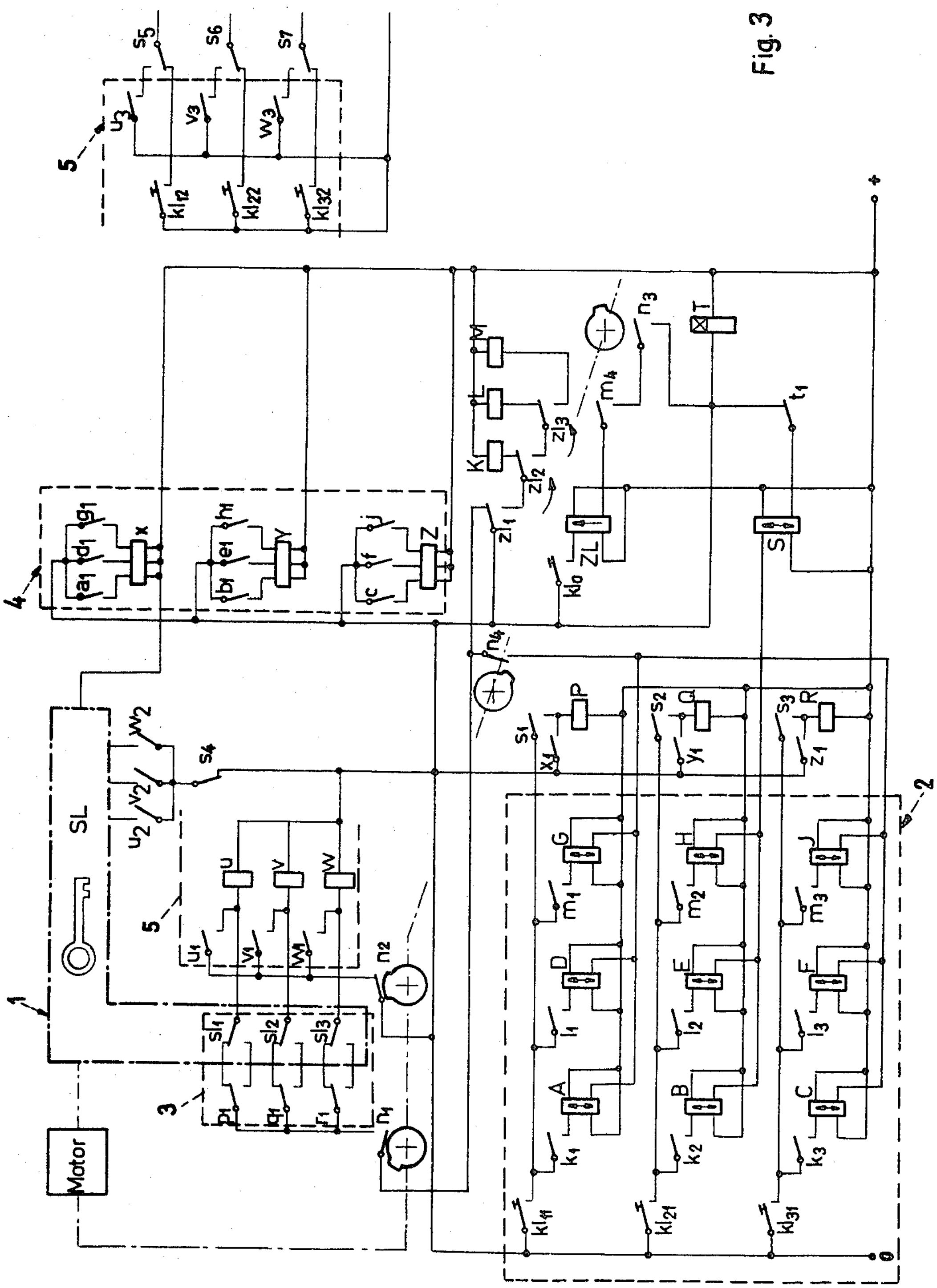
FIG. 3 illustrates details of a possible form of circuitry for use in practicing the teachings of the present invention.

Furthermore, as seen by referring to the central portion of FIG. 3 there is provided a contact $kl_0$ which is closed during each key actuation, and therefore can be designated as the common contact.

4. The output takes place via the contacts ($u_3$, $v_3$, $w_3$) forming a part of the output stage 5.

5. The key generator SL 1 may be equipped, for instance, with components of the type disclosed in Swiss Patent 471,432 permitting an electrical information input and output.

The apparatus is equipped with a suitable drive system in the form of a drive motor, labeled as such in FIG. 3 which, on the one hand, drives the key generator SL 1 in accordance with a prescribed program and, on the other hand, actuates the cam contacts $n_1$, $n_2$, $n_3$, $n_4$, whereby the illustrated cam disks have only been schematically shown. Their function will be readily apparent from the description to follow.

When placing the apparatus into operation the entire system is supplied by any suitable and therefore non-illustrated supply source, at the minus (−) and plus (+) poles, with direct-current and the drive system (motor) is placed into its preparatory state. An excitation-delayed relay T opens its contact $t_1$. During the delay-time a bistable relay S is placed into its rest position, so that the contact $s_4$ is closed. The contact $s_1$, $s_2$, $s_3$ are opened, the contacts $s_5$, $s_6$, $s_7$ are placed in the illustrated position. The actuation of a key of the keyboard, on the basis of the above-described explanation, now triggers the following operations:

1. Closing of the keyboard common contact $kl_0$ by mechanically coupling, as above explained.

2. Closing of the contacts $kl_{11}$, $kl_{12}$; $kl_{21}$, $kl_{22}$; $kl_{31}$, $kl_{32}$, depending upon the code group of the selected character.

3. Release of the drive system (motor) for carrying out an operational cycle by mechanical coupling.

The first inserted character is stored at the bistable relays A, B, C. The second character is stored at the bistable relays D, E, F, and the third character at the bistable relays G, H, J. The sequence control takes place by means of a so-called counter-relay zl which, for each pulse from the common contact $kl_0$, actuates a successive contact of its row $zl_1$, $zl_2$ and so forth.

During the presence of the first character the contact $zl_1$ is closed, so that the relay K is energized. The contacts $k_1$, $k_2$, $k_3$ connect the relays A, B, C with the keyboard contacts $kl_{11}$, $kl_{21}$, $kl_{31}$, respectively, so that the first character is stored at that location.

The second character energizes through the agency of the common contact $kl_0$ once again the winding of the counting relay ZL which now closes its contact $zl_2$, so that the relay L is energized and the relay K is deenergized. Storage of the second character occurs via contacts $l_1$, $l_2$, $l_3$ at the relays D, E, F.

After insertion of the third character, the relays G, H, J are also provided with a stored character, and the relay M is energized. By means of the contact $n_3$ a pulse is delivered to the counterwinding of the counter-relay ZL via the contact $m_4$ which places the counter-relay ZL back into its rest position, so that also relay M is de-energized.

Previously three detector relays X, Y, Z are energized. These possess three identical windings and respond when at least two of them are energized, so that a majority decision can be reached. By means of their contacts $x_1$, $y_1$, $z_1$ the relays P, Q, R are energized. The same information therefore appears at the left portion of the mixing stage 3 (FIG. 2) in the form of the position of the contacts $p_1$, $q_1$, $cr_1$ (FIG. 3). The key generator SL (FIG. 3 or block 1 of FIG. 2) has in turn introduced the base key position of its contacts $sl_1$, $sl_2$, $sl_3$.

The mixing now occurs in accordance with Exclusive-Or-logic operations and the finally reformed unveiled text key character is stored at the relays U, V, W as soon as the contact $n_1$ has closed. These relays latch in with their contacts $u_1$, $v_1$, $w_1$ via the contact $n_2$.

It is not possible to influence such relays sooner, since the null potential for the contact $n_1$ is delivered via the contact $zl_1$ which has already been thrown during the first character input.

Since the contact $s_4$ is closed, the desired information is introduced into the key generator through the agency of the contacts $u_2$, $v_2$, $w_2$. At the end of the operational cycle of the third character the nine storage relays A–J are reset via the contact $n_4$, whereby the relay S is also simultaneously actuated. Thereafter the relays X, Y, Z fall back into their rest position. The contacts $s_1$, $s_2$, $s_3$ close the relays P, Q, R at the keyboard, so that all subsequent characters are directly inserted into the mixing stage. The contract $s_4$ opens, so that the contacts $u_2$, $v_2$, $w_2$ are ineffectual; the contacts $s_5$, $s_6$, $s_7$ finally switch the output to the contacts $u_3$, $v_3$, $w_3$. Previously they were connected to the keyboard contacts $kl_{12}$, $kl_{22}$, $kl_{32}$, in order to ensure for a plain throughput of the inserted text. At the end of one of each operational cycle the relays U, V, W are always reset back into their rest position owing to opening of the contact $n_2$.

Figure 1:
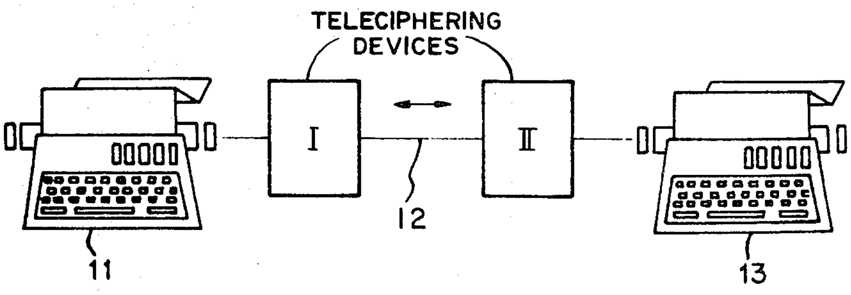
FIG. 1 is a schematic illustration of a transmission or communication line serving to explain the concepts of this invention.

As already mentioned, the above described circuit provides a very simple embodiment of the invention. Those skilled in the art will be able to realize other more complicated solutions without difficulty, and hereinafter there will be described a practical possibility in conjunction with direct a on-line teleprinter enciphering devices (teleciphering devices). Now, in FIG. 1 there is illustrated schematically a communication line or network incorporating a teleprinter 11 and a further teleprinter 13 as well as a connection line 12. Operatively associated with the teleprinter 11 is a teleciphering device I and with the teleprinter 13 a teleciphering device II. These teleciphering devices I and II operate in the manner that they permit of alternate operation as, for instance, described in Swiss Patent 374,717. Depending upon the direction of transmission they can interchange their roles or functions. A transmitting device can operate as a plain text transmitter or encipherer. A receiving device can operate as a plain text transmitter or decipherer.

In the rest condition both devices are set to "plain." There is thus possible the conventional alternate teleprinter operation in "plain." It is presupposed that at both devices the internal key generators 1 have already been previously provided with the same base programs, and that these programs have been stored at the generators.

If the transmitting location desires to send a secret text or message, then it makes this known to the receiver. At both locations now the operating controls of the devices are switched to "secret text-preparatory state."

Thereafter the transmitting location inserts a certain number, for instance five letter characters, into the teleprinter keyboard which represents the so-called text key or code word. Actually, insertion is also possible by perforated or magnetic tapes in the event suitable scanners are provided at the teleprinter or at the teleciphering enciphering device.

The teleciphering device 1 stores these five characters at the storage 2. Together with the available base key of the key generator 1 (for instance according to Swiss Patent 326,555) they are camouflaged or veiled at the mixing stage 3, and thereafter in the usual teleprinter rhythm are transmitted by the output location 5 automatically four respective times in succession. Additionally, they are also utilized in a non-veiled form for setting the actual key generator.

At the end of the group of these twenty characters the device I automatically switches over into the so-called secret operational mode. In the meantime it has of course carried out the necessary switching operations which has placed the key generator in its correct starting position, so that the next signal can be transmitted in an enciphered condition, without repetition, as the first character of the text.

The device II stores the teleciphering incoming characters likewise in its storage 2, individual stores being provided in such a manner that the five character elements conventional in teleprinter systems, also known as bits in more modern day terminology, can be individually stored. For instance, there are available 3 × 5 individual stores and the first four signals are recorded in the sequence in which they arrive. For instance, if the first character of the code word which has been transmitted four times is a "Q," then, on the assumption of using the international teleprinter code number 2, there results:

| | Position | I | II | III | IV | V |
|---|---|---|---|---|---|---|
| Storage | A | L | L | L | O | L |
| Storage | B | L | L | L | O | L |
| Storage | C | L | L | L | O | L |

The fourth arriving signal can no longer be stored and is neglected. In so doing it is assumed that a communication channel is available which for itself functions with maximum transmission security, something of course which is absolutely required for a key operation.

However, it can still also happen that the transmission is disturbed. That is the reason why a repetition is undertaken which therefore guarantees that the text key-information arrives with the greatest possible probability at the receiver. Owing to erroneous transmission, it is possible that, for instance, the following information could be stored at the receiver:

| | Position | I | II | III | IV | V |
|---|---|---|---|---|---|---|
| Storage | A | L | O | L | O | L (Element II false) |
| Storage | B | L | L | O | O | L (Element III false) |
| Storage | C | O | L | L | O | L (Element I false) |

The next operation now consists in a majority detection of the stored elements by the comparision stage 4. In the second example there results:

L L L O L which corresponds to the original "Q." Naturally for the first example the same result is to be expected. The thus derived character is delivered as the text key character No. 1 to the mixing stage 3. At the key generator there is already present the base key information, so that the unveiling operation is possible, whereupon the first code word character reformed from the "Q" is inserted into the key generator 1.

The same procedure is undertaken with the four further character blocks.

At the end, that is to say after twenty characters have arrived, the key generator II is in the same condition as for the device I.

The device II is automatically switched over to secret operation, so that the 21st arriving signal is processed as the first character of the message or text, that is deciphered and further conveyed via the output stage 5 to the teleprinter.

It is also possible to transmit the text key information in a plain form and at both devices to introduce such in a veiled condition into the key generators. The basic principle is maintained in that the personnel assigned the job of operating the devices or apparatuses do not require any information regarding the base key and, on the other hand, knowledge of the text key information in the form which it appears at the transmission lines does not permit any conclusions to be drawn about the apparatus.

While there is shown and described present preferred embodiments of the invention, it is to be distinctly understood that the invention is not limited thereto but may be otherwise variously embodied and practiced within the scope of the following claims.

What is claimed is :

1. An apparatus for enciphering and deciphering multidigit coded signals, comprising a key generator, an input storage device, and mixing means, said key generator and said input storage device being connected to said mixing means; said mixing means serving to couple, character element by character element, characters delivered from said input storage device with characters delivered from said key generator; said input storage device including first storage means having a number of individual storage units for storing the character elements of a predetermined number of successive characters, said input storage device including comparison detector means for detecting the type of character elements at corresponding character element positions of said predetermined number of characters and for producing a majority signal in response to the majority of the detected character elements of the same type and at the same character element position, said input storage device including second storage means connected to said comparison detector for receiving the majority signal.

2. The apparatus as defined in claim 1, further including an automatically actuated plain/secret-switch means possessing a preparatory position and which, following completion of programing of the key generator, is automatically switched over to operate in the secret text mode.

* * * * *